(12) United States Patent
Eifert et al.

(10) Patent No.: US 11,697,383 B2
(45) Date of Patent: Jul. 11, 2023

(54) STATE OF FUNCTION ADAPTIVE POWER MANAGEMENT

(71) Applicant: Ford Global Technologies, LLC, Dearborn, MI (US)

(72) Inventors: Mark Eifert, Park Ridge, IL (US); Pankaj Kumar, Canton, MI (US); Timothy Panagis, Ypsilanti, MI (US); Peter Phung, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 17/326,749

(22) Filed: May 21, 2021

(65) Prior Publication Data

US 2022/0371531 A1 Nov. 24, 2022

(51) Int. Cl.
*B60W 10/26* (2006.01)
*B60R 16/033* (2006.01)
*B60W 10/18* (2012.01)
*B60W 10/20* (2006.01)
(Continued)

(52) U.S. Cl.
CPC .......... *B60R 16/033* (2013.01); *B60W 10/18* (2013.01); *B60W 10/20* (2013.01); *H02J 7/0047* (2013.01);
(Continued)

(58) Field of Classification Search
CPC ..... B60R 16/033; B60W 10/18; B60W 10/20; B60W 10/26; B60W 10/28;
(Continued)

(56) References Cited

U.S. PATENT DOCUMENTS 8,552,590 B2 * 10/2013 Moon ............... H02J 3/32
307/64
8,612,079 B2 12/2013 Tang et al.
(Continued)

FOREIGN PATENT DOCUMENTS

CN 115039317 A * 9/2022 ............ B60L 50/64
DE 102012000442 B4 * 2/2021 ............ B60L 58/12
(Continued)

OTHER PUBLICATIONS

"BU-908 Battery Management System (BMS)," CADEX, Powering BioMedical Devices, Apr. 24, 2019, 10 pgs.

*Primary Examiner* — B M M Hannan
(74) *Attorney, Agent, or Firm* — Frank Lollo; Eversheds Sutherland (US) LLP (57) ABSTRACT

A method for controlling a vehicle active chassis power system includes determining, via a processor, a minimum output voltage/current threshold for an aggregated power supply associated with an active chassis operation, and generating an aggregate State of Function (SoF) indicative of a maximum voltage/current budget for an output of the vehicle active chassis power system. The aggregate SoF is based on a primary power source voltage/current output and a power storage voltage/current output. The method further includes causing to control an active chassis power system actuator based on a minimum voltage/current value associated with the aggregate SoF. Causing to control the active chassis power system actuator can include publishing the aggregate SoF to a braking actuator, a steering actuator, or to a domain controller that actively distributes an aggregated power supply capability SoF to a braking actuator and a steering actuator based on one or more present vehicle states.

20 Claims, 6 Drawing Sheets

(51) Int. Cl.
*H02J 7/00* (2006.01)
*B60W 10/28* (2006.01)
(52) U.S. Cl.
CPC ............ *B60W 10/26* (2013.01); *B60W 10/28* (2013.01); *B60W 2510/0208* (2013.01); *B60W 2510/1005* (2013.01); *B60W 2510/244* (2013.01); *B60W 2710/18* (2013.01); *B60W 2710/20* (2013.01)
(58) Field of Classification Search
CPC . B60W 2510/0208; B60W 2510/1005; B60W 2510/244; B60W 2710/18; B60W 2710/20; H02J 7/0047; H02J 7/0048; H02J 7/0068; H02J 7/1423; H02J 7/1438; H02J 1/106
USPC .......................................................... 701/41
See application file for complete search history.

(56) References Cited

U.S. PATENT DOCUMENTS

| | | | |
|---|---|---|---|
| 8,749,193 B1 * | 6/2014 | Sullivan | H02J 1/08 307/10.7 |
| 2010/0211804 A1 * | 8/2010 | Brumley | G06F 1/3203 713/300 |
| 2013/0140888 A1 * | 6/2013 | Edwards | H02J 1/10 307/20 |
| 2014/0312685 A1 * | 10/2014 | Moga | G01R 31/55 307/9.1 |
| 2015/0224845 A1 * | 8/2015 | Anderson | B60G 17/019 701/37 |
| 2015/0311736 A1 | 10/2015 | Park et al. | |
| 2017/0279170 A1 * | 9/2017 | O'Hora | H01M 50/204 |
| 2019/0176639 A1 | 6/2019 | Kumar et al. | |
| 2020/0052599 A1 * | 2/2020 | Phipps | H02M 3/33523 |
| 2020/0081511 A1 * | 3/2020 | Brown | G06F 1/305 |
| 2020/0144934 A1 * | 5/2020 | Chen | H02M 7/53803 |
| 2021/0065544 A1 * | 3/2021 | Bai | G06N 20/00 |
| 2022/0032806 A1 * | 2/2022 | Christensen | B60L 53/57 |
| 2022/0181902 A1 * | 6/2022 | Takahashi | H02J 7/34 |

FOREIGN PATENT DOCUMENTS

EP 3696930 A1 * 8/2020 ............... H02J 1/06
WO 2012156603 A1 11/2012

* cited by examiner

STATE OF FUNCTION ADAPTIVE POWER MANAGEMENT

TECHNICAL FIELD

The present disclosure relates to vehicle active chassis systems, and more particularly, to State of Function adaptive power management for vehicle active chassis systems.

BACKGROUND

In vehicle power systems, it is advantageous to identify performance metrics for active chassis power systems and adjust operational settings that can identify and mitigate active power supply interruptions or anomalies during vehicle operation. Using conventional power management approaches such as monitoring power system state of charge in conjunction with a voltage/current measurement of an alternator or other energy generation system and battery may not provide adequate information to accurately determine whether the power source can pull a certain amount of current and still remain above a baseline threshold voltage/current. Determining a state of charge in view of an energy output of a power source (e.g., an alternator) may not be, in combination, determinative of a future functionality of the active chassis power system.

Other conventional strategies may use State of Charge (SoC) of a low-voltage battery to make control decisions. This approach is also not indicative of the active chassis power system functionality because SOC is known to be 5% to 10% accurate under ideal circumstances. Therefore, SoC alone is not an accurate indicator of the ability to source a given amount of power over time, because the inaccuracy increases as the low-voltage battery ages.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured and/or programmed to control a vehicle active chassis power system using State-of-Function signals. The State-of-Function (SoF) signal describes the maximum current that may be drawn from an energy storage device, a primary power source like an alternator, or a combination of these such that the minimum voltage of the electrical distribution system measured at a reference point is greater than a threshold guaranteeing nominal operation of electrical components. This disclosure defines state of function metrics for the primary low-voltage (12V) power sources and energy storage devices in a vehicle. It also defines an aggregated state of function describing the power delivery capability of primary power sources combined with energy storage devices. Finally, the disclosure describes control strategies that use these metrics to avoid power supply saturation and minimize the effect of saturation on electrical functionality. The following sections are organized as follows.

According to one or more embodiments, two types of SoF metrics for energy storage devices can first include a maximum current and a corresponding duration that may be supplied by an energy storage device, and a second type of SoF metric can describe the voltage response to a future transient load given a predefined discharge history before the transient occurs.

In other aspects, control strategies are described that limit high-powered transient loads depending on the SOF. In other aspects, the system may deactivate any load in order to favor the functionality of high-power loads, especially in examples of chassis control actuation.

Embodiments of the present disclosure describe improvements over conventional strategies that use the state of charge (SoC) of a low-voltage battery to make control decisions, because the conventional SoC methods have historically been accurate to within 5 to 10%, which may not be sufficient to indicate the ability to source a given amount of power over time, and may become increasingly inaccurate as the vehicle battery ages.

Illustrative Embodiments

The disclosure will be described more fully hereinafter with reference to the accompanying drawings, in which example embodiments of the disclosure are shown, and not intended to be limiting.

Figure 1:
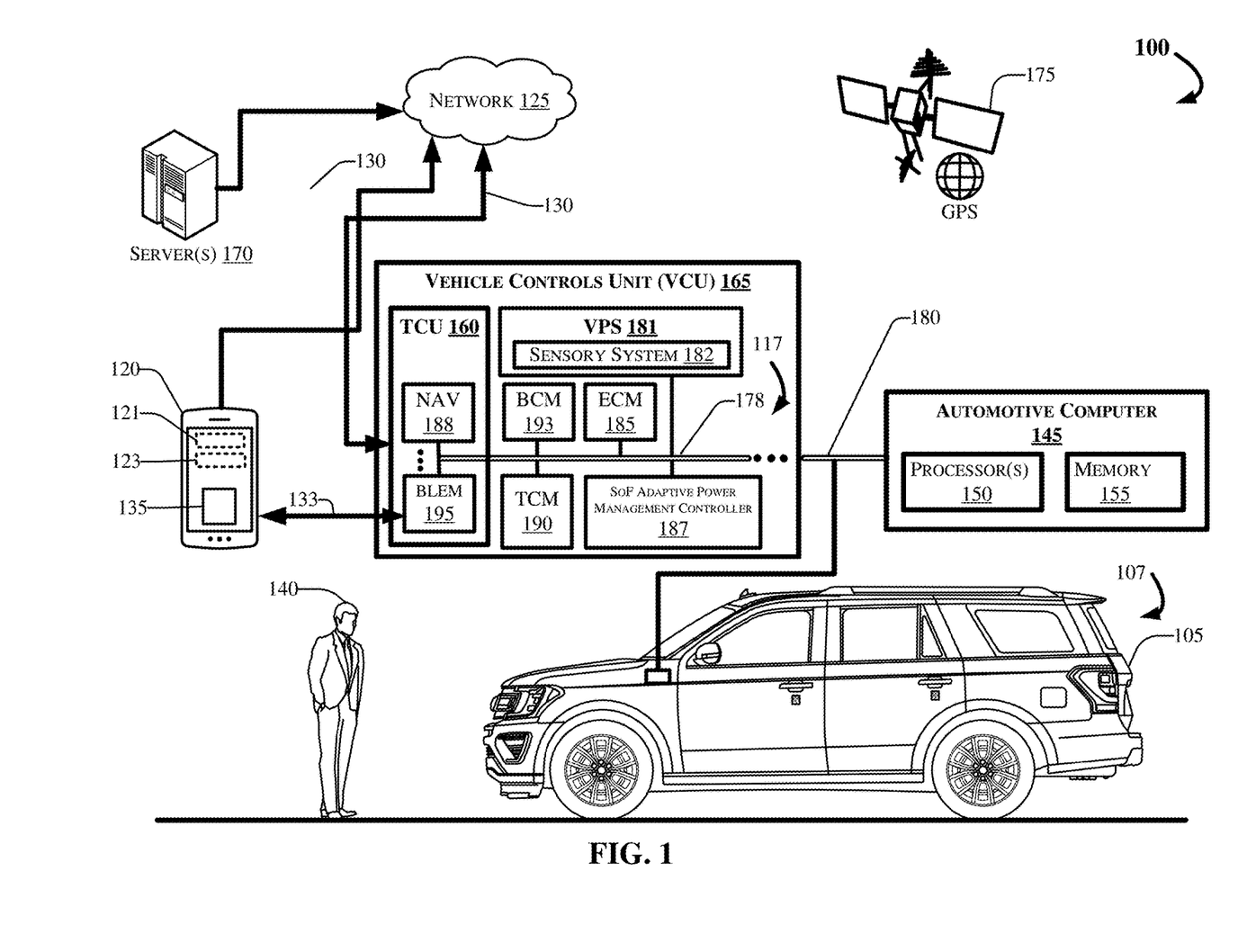
FIG. 1 depicts an example computing environment in which techniques and structures for providing the systems and methods disclosed herein may be implemented.

FIG. 1 depicts an example computing environment 100 that can include a vehicle 105. The vehicle 105 may include an automotive computer 145, and a Vehicle Controls Unit (VCU) 165 that can include a plurality of electronic control units (ECUs) 117 disposed in communication with the automotive computer 145. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

The vehicle 105 may also receive and/or be in communication with a Global Positioning System (GPS) 175. The GPS 175 may be a satellite system (as depicted in FIG. 1)

such as the global navigation satellite system (GLNSS), Galileo, or navigation or other similar system. In other aspects, the GPS 175 may be a terrestrial-based navigation network. In some embodiments, the vehicle 105 may utilize a combination of GPS and Dead Reckoning responsive to determining that a threshold number of satellites are not recognized. According to some embodiments, the GPS 175 may generate one or more signals that may be used to generate and/or include an electronic horizon having x, y, and z coordinates of ideal paths for vehicle navigation.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components, such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes an HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., Level-5 autonomy) or in one or more partial autonomy modes, which may include driver assist technologies. Examples of partial autonomy (or driver assist) modes are widely understood in the art as autonomy Levels 1 through 5.

The mobile device 120 can include a memory 123 for storing program instructions associated with an application 135 that, when executed by a mobile device processor 121, performs aspects of the disclosed embodiments. The application (or "app") 135 may be part of the SoF adaptive power management system 107, or may provide information to the SoF adaptive power management system 107 and/or receive information from the SoF adaptive power management system 107. For example, the app 135 may be used for updating the adaptive power management system 107, and/or communicating information to or from the user 140 that can provide settings, controls, and/or automatic update permissions for the system 107.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 133 that can be direct connection(s) between the vehicle 105 and the mobile device 120. The wireless connection(s) 133 may include various low-energy protocols, including, for example, Bluetooth®, Bluetooth® Low-Energy (BLE®), UWB, Near Field Communication (NFC), or other protocols.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the SoF adaptive power management system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing an SoF adaptive power management system program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a power bus 178 with the automotive computer 145, and may be configured and/or programmed to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, SoF adaptive power management controller 187, etc. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets received from the application 135 operating on the mobile device 120, from one or more instruction sets stored in computer memory 155 of the automotive computer 145, including instructions operational as part of the SoF adaptive power management system 107.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high-speed CAN (which may have bit speeds up to 1 Mb/s on CAN, 5 Mb/s on CAN Flexible Data Rate (CAN FD)), and can include a low-speed or fault-tolerant CAN (up to 125 Kbps), which may, in some configurations, use a linear bus configuration. In some aspects, the ECUs 117 may communicate with a host computer (e.g., the automotive computer 145, the SoF adaptive power management system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the SoF adaptive power management system 107, and/or via wireless signal inputs received via the wireless connection(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality.

The computing system architecture of the automotive computer 145, VCU 165, and/or the SoF adaptive power management system 107 may omit certain computing modules. It should be readily understood that the computing environment depicted in FIG. 1 is an example of a possible implementation according to the present disclosure, and thus, it should not be considered limiting or exclusive.

Embodiments of the present disclosure describe a "state-of-function" (SoF) signal describing the maximum current that may be drawn from an energy storage device (e.g., the power storage 215), the primary power source (which may include an alternator, for example) or a combination of these such that the minimum voltage of the electrical distribution system measured at a reference point is greater than a threshold guaranteeing nominal operation of electrical components. The SoF signals described herein may include information that may in whole or in part be aggregated to characterize vehicle chassis control power system functionality, and may further be usable to inform a chassis power control system to mitigate and/or completely avoid any interruptions to chassis control based on current operational events that could reduce the driving pleasure and operational reliability of the vehicle 105.

Embodiments may also describe a second type of SoF signal that describes the predicted future power delivery capability of a battery given a defined average discharge rate over a prediction horizon followed by a high transient load. This second type of SoF signal may be used to predict future interruptions to chassis control based on future operational events.

Some embodiments can include load management, power supply, and powertrain control strategies that use these SoF signals. The load management strategies may activate, deactivate, enable, disable, and set actuation bounds for electrical vehicle loads associated with actuators such as steering, braking, suspension, and other actuation elements of the vehicle 105. The strategies for driving modes of operation can maximize the ability of the power supply 217 to provide power to chassis control systems that have high transient load characteristics. The power supply control strategies enable transfer of power from the propulsion battery in a hybrid or electric vehicle to the low-voltage power distribution system and enable charging the low-voltage battery in a plug-in vehicle (PHEV or BEV). Powertrain control strategies may further enable stop-start functionality using the state of function of the low-voltage battery as an indicator to determine whether the power storage device(s) such as vehicle batteries can support a vehicle restart.

The control strategies are improvements over similar strategies that use the state of charge (SOC) of the low-voltage battery to make control decisions because the SOC is only accurate to within 5% to 10% under the best circumstances, and it is not an accurate indicator of the ability to source a given amount of power over time. The inherent inaccuracy becomes more pronounced as the battery ages.

A vehicular low-voltage power supply generally includes a primary power source and one or more energy storage devices. In a conventional vehicle, the primary low-voltage (LV) power source is an alternator, and the energy storage device is a battery. While most batteries that are implemented in LV power supply systems are lead-acid batteries, lithium-ion and other types of batteries or arrays of ultracapacitors may be used as well.

The ability of the low-voltage power supply to realize the electrical functionality of the loads depends on the capabilities of both the primary power source and the energy storage system. In a conventional vehicle, the power supply is sized in such a way that the battery supplies the bulk of high transient loads like those drawn from electrically-assisted power steering and other chassis-control actuators, because the alternator has a limited response time and can only generate high currents at high rotational speeds. As the battery ages, its ability to supply transient loads decreases because of higher internal resistance, lower charge acceptance, and a diminishing capacity. The higher internal resistance directly affects the ability to source high currents, and the combination of lower charge acceptance and smaller capacity effect the transient response indirectly by lowering the amount of charge that the battery typically stores.

When the battery ages, more of the transient load will be drawn from the alternator until its capability is exceeded. At that point, the voltage on the power distribution network and at the load may drop to sub-optimal levels. If the transient load is drawn by electrically-assisted power steering (EPAS), the assist may diminish or disappear altogether, or in the case of a steer-by-wire system (SbW), a turn may not be completed. Because EPAS and SbW carry out control functions, the power supply and other loads, as well as the actuation of EPAS and SbW themselves, should be controlled in such a way as to maintain a minimum level of actuation and functionality to fulfill operational goals. A transient load may also disrupt the functionality of other loads that are being powered through the power distribution network when the battery's ability to support them is diminished. The associated short-term low-voltage events may deactivate electronic control units and cause them to reset, which may also be relevant.

In order to mitigate these problems, a form of the state of function of the power supply may be continuously broadcast to high-power transient loads. The state of function may communicate the maximum current that the high-power load may draw without saturating the power supply and forcing the voltage on the power distribution network to a sub-optimal level.

Depending on the nature of the transient load and architecture of the power distribution system, the SoF may take the capabilities of both the main power storage device(s) (e.g., the battery, ultracapacitor, etc.) and the main power generators (e.g., the alternator, DC/DC-converter in a HEV or BEV, etc.) into consideration. The power storage and main power generator are considered collectively as a power supply, where the capabilities of both types of elements are considered collectively as an aggregated power supply. An important detail here is that the capability of the aggregated power supply is continuously broadcast or published, and is not requested when the transient load is activated, because the latency of the communication system may delay the reception of the information to such an extent that it cannot be acted on if it is broadcasted when the transient occurs. Accordingly, the SoF adaptive power management system 107 may publish the aggregate SoF in a continuous manner prior to receiving a request associated with activation of the transient load.

If a high-power transient load receives information that the capability of the power supply is sufficiently low such that a worst-case actuation may cause it to saturate, it may limit possible actuations in such a way that functionality is de-rated but sufficiently fulfilled. The limited actuation may also avoid low-voltage events and allow other systems to operate normally. Examples of such an event could include a rapid braking event that diverts power to the braking system that in part may be needed for steering actuation, or vice versa.

In one or more embodiments, the SoF adaptive power management system 107 may allocate power individually to transient and conventional loads belonging to a functional group or domain. This concept foresees a domain controller that obtains a power or current budget from the power supply in the form of an aggregated SoF. The SoF adaptive power management system 107 may dynamically set current limits to each actuator or subsystem in its domain to guarantee a minimum level of electrical functionality. For example, it may allocate a low current limit to the electrically boosted braking system (EBB) and a high current limit to the EPAS at low speeds, because at low speeds, low brake boosting levels are necessary, but the loading of the steering system and required assist force is the highest.

The solution described above limits the power consumption of transient loads through controlled derating. However, because such loads often belong to chassis control systems, an additional solution architecture was developed that enables the deactivation of other non-critical loads in order to reserve power supply capability for those with a higher relative importance and relevance. The solutions that were developed use control strategies that use short and long-term predictions of power supply capability and load. The long-term predictions are created using data from telematic systems. The SoF adaptive power management system 107 may leverage SoF metrics to calculate the predictions of power supply capability. Accordingly, the SoF adaptive power management system 107 may include control strategies configured to deactivate a minimum number of loads ranked by relative importance to achieve a balance between power supply capability and demand. Conventional load management strategies may deactivate large groups of loads using the duty cycle of the main power generator (e.g., the alternator) and power storage (e.g., the battery) terminal voltage as deactivation criteria. According to one or more embodiments, the SoF adaptive power management system 107 may only deactivate the smallest set of loads possible, which can increase a positive driver experience by minimizing insufficient or less-than-ideal power supply to steering and braking functionality.

The stop-start functionality in hybridized vehicles is often enabled or disabled with respect to the SoC of a low-voltage starter battery when the vehicle engine is in a key-on state with a conventional 12V starter motor. However, due to the limited accuracy of SoC measurements and the inherent inability to use SoC as a metric to judge power-delivery capability, thresholds using the state of charge to enable stop-start functionality must be calibrated conservatively to avoid vehicles being stranded due to depleted starter batteries. This means that high thresholds are chosen. However, batteries with a state of charge that is lower than the threshold are often capable of still starting the vehicle. This leads to customer dissatisfaction if the stop-start feature is often disabled, and it limits the fuel consumption benefit that the feature was designed to deliver.

In order to mitigate this problem, better metrics to predict the ability of a battery to restart a vehicle are required. The new SoF metrics for future discharge events that are described in the present disclosure may provide increased accuracy as compared to conventional systems. The SoF metrics may realize increased accuracy because the SoF adaptive power management system 107 includes adaptive battery models that run online and adapt their parameters as the battery ages. The SoF adaptive power management system 107 also has the advantage of directly estimating battery voltage during a future start instead of relying on a transfer function that defines the ability to start with respect to state of charge.

When the vehicle 105 is parked and keyed off, the battery is discharged slowly by electronic control units monitoring vehicle states and performing over-the-air updates. After being parked, the vehicle 105 must always be able to be started again, which implies that the capability of the battery must be sufficient to crank the vehicle after it has been discharged. The predicted state of function of the battery corresponding to the minimum voltage associated with a future engine crank may be used to guarantee the ability to start the vehicle. As in the case of enabling the stop-start feature, a state of function metric is better suited to judge the ability of a battery to support a future start than the state of charge.

If the predicted state of function indicates that the battery may not have the capability to start the vehicle, a load controller may deactivate electronic control units and not allow over-the-air updates during a key-off phase. In the case of a hybridized vehicle with a high-voltage propulsion battery, the low-voltage battery may be recharged, and the low-voltage loads may be supplied by the high-voltage battery through a DC/DC-converter. If the vehicle 105 is an electric vehicle (BEV) or plug-in hybrid (PHEV), the low-voltage battery may be recharged, and the low-voltage loads may be supplied when the vehicle is plugged-in through a rectifier-converter unit.

Figure 2:
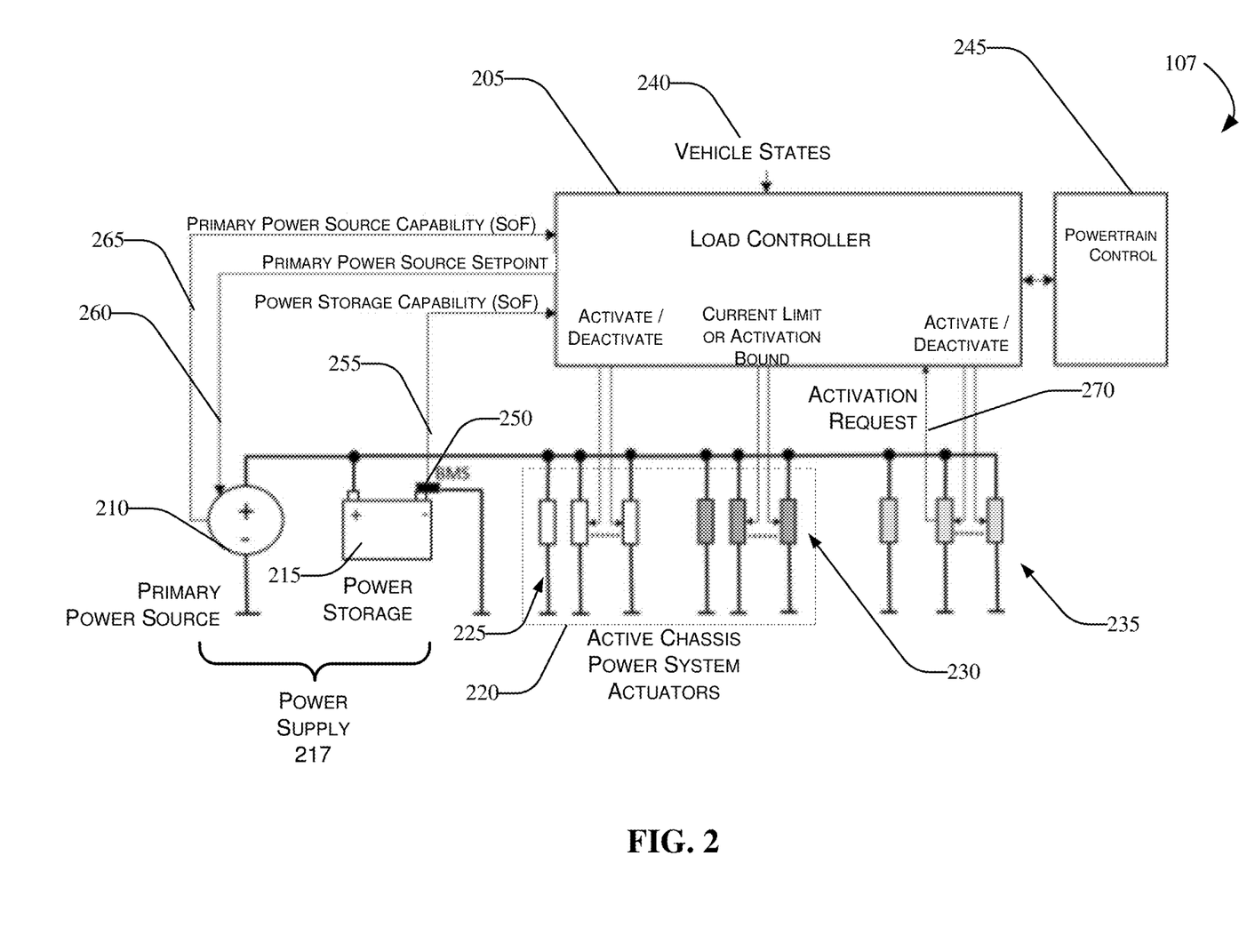
FIG. 2 depicts an SoF adaptive power management system that includes an SoF adaptive power management controller in accordance with the present disclosure.

FIG. 2 depicts an SoF adaptive power management system 107 that includes an SoF adaptive power management controller 187, in accordance with embodiments of the present disclosure. As described above, it may be advantageous to determine whether the vehicle chassis control actuators are functional with respect to power supply and distribution. The SoF adaptive power management system 107 may determine maximum output voltage/current thresholds for an aggregated power supply associated with an active chassis operation in a vehicle, and generate an aggregate SoF indicative of a maximum voltage/current budget for an output of the vehicle active chassis power system based on a primary power source voltage/current output and a power storage voltage/current output. The budget may be used in various ways for battery and power supply SoF monitoring for mitigation control. More particularly, the SoF adaptive power management system 107 may control the active chassis power system actuator(s) in the vehicle based on the voltage/current budget associated with the aggregate SoF such that normal functionality is planned for and executed based on current and predicted low current events.

According to an embodiment of the present disclosure, FIG. 2 depicts the SoF adaptive power management system 107 that includes a load controller 205, a primary power source 210, and a power storage 215. The load controller 205 is disposed in communication with a powertrain control 245, one or more active chassis power system actuators 220, and one or more actuators such as, for example, one or more key-off loads 235.

Traditionally, electrical consumers in some vehicles are designed to operate with a supply voltage of around 12V. These loads may be referred to as low-voltage (LV) loads, as opposed to loads designed to operate at the 48V level or at over 100V, and which are supplied by traction batteries that are a part of a hybridized propulsion system.

LV loads may be divided into three categories: conventional key-on loads 225, high-power key-on loads 230, and key-off loads 235. The conventional key-on loads 225 and high-power key-on loads 230 are collectively referred to herein as active chassis power system actuators 220. FIG. 2 depicts an example power supply 217 that includes a primary power source 210 and a power storage 215. Every voltage source and every load connected to the power supply 217 generally sees the same voltage. Both high-power loads (e.g., actuators associated with high-power key-on loads 230) and key-off loads (e.g., actuators 225) strain the power-delivery capability of the power supply 217, which can include the primary power source 210 and the power storage 215.

The high-power key-on loads 230 can include starter motors, chassis-control actuators such as, for example, electrically-assisted power steering (EPAS), steer-by-wire systems (SbW), and electrically boosted brakes (EBB), among other possible systems.

The power supply in a conventional vehicle may generally include a primary power source and a power storage. In some embodiments, the primary power source 210 may include alternator and the power storage 215 may include one or more batteries, which may in combination be dimensioned to supply the high-power required by these loads primarily through the power storage 215.

The key-off loads 235 may include one or more electronic control modules (ECMs) that monitor CAN traffic and sensor inputs (e.g., sensors associated with the VCU 165 (as shown in FIG. 1), and may further include one or more control modules whose software is updated via the mobile device 120 or via WIFI interface (e.g., using the network 125 while the vehicle 105 is parked in a key-off state. Because the primary power source 210 cannot generate when the vehicle 105 is keyed-off, these loads must also be supplied by the battery or other power storage 215.

The power supply 217 may include a battery monitoring sensor (BMS) 250 that measures and communicates the battery terminal voltage and current flowing in or out of the power storage 215, which may be battery, a subnet having an ultracapacitor, or other power storage device, which may be received at the load controller 205 as a power storage capability (SoF) signal 255. Commonly, a BMS delivers a simple state of function related to the ability to crank a vehicle that represents the minimum voltage during the cranking event. The BMS 250 may be a state-of-the-art battery monitoring sensor that utilizes battery terminal voltage and current measurements to estimate battery operational characteristics such as the state of charge (SOC) and the state of function (SOF) of the battery or other power storage device(s). These metrics are shown as power storage capability (SoF) signal 255. The SoF of a battery, for example, describes the ability of the battery to deliver a defined amount of power or current to a load while its terminal voltage is above or equal to a threshold representing a minimum acceptable voltage.

The SoF adaptive power management system 107 may calculate another type of SoF signal for the primary power source 210, as well. Although described in some embodiments as an alternator, the primary power source 210 may include other power generation devices such as an alternator, DC/DC-converter and/or a fuel cell, among other possible devices. The primary power source capability (SoF) signal 265 may define the amount of power or current that the alternator or other primary power source 210 may generate given its ambient temperature and rotational speed (for example, when the primary power source 210 is an alternator).

The maximum amount of power or current that may be sourced by the primary power source 210 is a function of some internal state or states. In the case of an electric machine or alternator, the maximum output is a function of its rotational speed and ambient temperature. In the case of a DC/DC-converter, it is a function of its ambient temperature and the temperature of its switching transistors.

Now considering the functional relationship of ambient temperature and maximum current, the state of function (SoF) of a primary power source ($SOF_{PPS}$) at any point in time t describes the maximum output current at that point in time in the expression, $$SOF_{PPS}(t) = I_{Max}(X(t)),$$

where Max(X(t)) describes the maximum output current given the relevant state(s) X(t) of the primary power source 210. Those relevant states may represent information like ambient temperature and rotational speed of an alternator when the primary power source 210 is configured as such. If a trajectory of states over a time horizon $\vec{X}$ may be predicted, then the state of function of the primary power supply over the time horizon $\overrightarrow{SOF}_{PPS}$ may be predicted as well. For example, if vehicle 105 speed is predicted over a time horizon, the rotational speeds of the engine (engine not shown in FIG. 2) and primary power source 210 (e.g., an alternator) over the horizon may be calculated as well. Using the prediction of alternator speed, the SoF of the alternator (depicted in FIG. 2 as the primary power source capability (SoF) signal 265), representing its maximum current output, may be predicted as well over the time horizon. The time horizon may be, for example, 1 second, 3 seconds, 5 seconds, etc.

A similar SoF signal may be defined for the vehicle battery, shown in FIG. 2 as the power storage capability (SoF) signal 255. The SoF adaptive power management system 107 may formulate two generic SoF function metrics for energy storage devices:

1. The maximum load current $I_{Load}$ that may be drawn from the power storage 215 for a given period of time T such that the voltage at the output terminals of the power storage 215 is greater or equal to a minimum voltage threshold $U_{Min}$, for example, $$SOF\_MaxI(U_{Min}, T) = I_{Load}{}^{max} \text{ such that}$$
$$U_{terminals} > U_{Min}, \text{ and}$$

2. The minimum voltage that will be measured at the output terminals of the power storage 215 $U_{Min}$ when the load current $I_{Load}$ is drawn for a time period T, for example, $$SOF\_MinU(I_{Load}, T) = U_{Min}{}^{min} \text{ such that } I = I_{Load}.$$

Like the metrics defined for primary power sources, $SOF\_MaxI(U_{Min}, T)$ represents the capability of the energy storage device as defined by a maximum current value. However, unlike $SOF_{PPS}(t)$, it is defined for a specified duration and minimum voltage. The maximum current value may be combined with $SOF_{PPS}(t)$ to calculate an aggregated SoF for the entire power supply 217. For example, the SoF adaptive power management system 107 may calculate an aggregate state of function (aggregate SoF) signal of the entire power supply 217 for both the primary power source 210 (e.g., an alternator) and the power storage 215 (e.g., a battery). As opposed to the state of function corresponding to a cranking event described above, these new state of function signals can include a primary power source setpoint signal 260 that may define a maximum output current. The load controller 205 may receive the SoF signals 255 and 265, and control load activation based on those signal inputs to prevent saturation of the power supply 217, and to maximize electrical functionality in the vehicle 105 with emphasis on systems and loads (e.g., steering, braking, etc.) depicted in FIG. 2 as the active chassis power system actuators 220. Accordingly, the load controller 205 may publish the aggregate SoF as a current limited or activation bound signal that controls the high-power key-on loads 230, and/or activated or deactivated conventional key-on loads 225.

The SoF metric SOF_MinU defines the minimum voltage that will be measured at the output terminals of the battery when a given load current is applied, which may be an immediate response metric for immediate discharges (that occur without delay). For example, the SoF adaptive power management system 107 may determine the maximum output current threshold for the aggregated power supply 217 in a predetermined interval of time (e.g., every 1, 3, 5, 7, 10 seconds, etc.).

The state of function metric $SOF\_MinU(I_{Load}, T)$ for a given load current $I_{Load}$ with a duration T may estimate the minimum voltage measured at the battery terminals given a defined constant load current and duration under the assumption that the discharge occurs without delay. The SoF adaptive power management system 107 may be calculate this metric directly using an equivalent circuit model and implemented directly in the BMS 250.

This metric is already implemented in some conventional vehicular BMS devices to estimate cranking voltage. According to some embodiments, the load controller 205 may calculate a voltage response to a future transient given a defined discharge history before the discharge occurs based on the BMS output (e.g., the power storage capability (SoF) signal 255), which may be used to estimate the maximum current that can be sourced by the power storage 215 for a given amount of time such that the voltage remains above a defined threshold. Calculating these new state of function metrics in this way is expedient, because conventional BMSs such as the BMS 250 do not have to undergo new development to deliver the SoF metrics described herein (e.g., the power storage capability (SoF) signal 255).

The metric SOF_MinU for Defined Battery Current Trajectory represents the minimum voltage that would be measured at the terminals of a battery if a defined current trajectory SOF_MinU($\vec{I}_{Batt}$, $\vec{t}$) flows at the terminals. As opposed to the state of function metric above, this metric SOF_MinU($I_{Load}$,T) processes a trajectory, where the former metric processes a pulse. The sign of the current trajectory may be positive, negative, or both, corresponding to discharging and charging, or having both occur over time.

The calculation of this metric may be calculated using an equivalent circuit model, which may be carried out directly in the battery monitoring sensor or elsewhere in a separate computing unit. In one aspect, the SOF_MinU metric may be SOF_MinU($\vec{I}_{Load}$, $\vec{t}$) carried out directly in the BMS 250 where the states of the battery like state of charge and internal temperature are calculated as well. It is assumed that when a new value of state of function is published to the chassis control actuators, the value may correspond to the states of the battery/power storage 215 at the point in time of publication. In other words, it is generally an instantaneous reading describing a state of charge currently.

The load controller 205 may periodically calculate this metric and publish the aggregate SoF throughout the vehicle 105 either directly to the BCM 193 and/or particular actuators (e.g., 225, 230, etc.). For example, the load controller 205 may publish to a steering actuator, a braking actuator, or both the steering actuator and the braking actuator(s) at a predetermined period of time such as 1 second, 2 seconds, 5 seconds, etc. According to another embodiment, the load controller 205 may perform the aggregate SoF calculation triggered by a CAN or LIN message to the sensor (e.g., an activation request 270).

In another aspect, the load controller may perform the aggregate SoF calculation based on a battery voltage response to a future transient discharge. The load controller 205 may utilize a voltage response of a future discharge event to enable or disable loads that may occur at future time horizon based on the minimum voltage threshold. For example, the load controller 205 may publish an aggregated power supply capability SoF to a braking actuator, and a steering actuator based on one or more present vehicle states 240.

The minimum voltage that will be measured at the output terminals of the energy storage device $U_{Min}$ when the load current $I_{Load}$ is drawn for a time period T at a defined ambient temperature $Temp_{Dis}$ after a wait period $T_{Wait}$ during which the charge $Q_{Wait}$ is removed from the energy storage device is represented by the expression:

$$\text{SOF\_Min}U(I_{Load},T,\text{Temp}_{Dis},Q_{Wait},T_{Wait})=U_{Min}^{min}$$
such that $I=I_{Load}$.

The voltage response of a future discharge event SOF_MinU($I_{Load}$,T,$Temp_{Dis}$,$Q_{Wait}$,$T_{Wait}$) includes the parameter $Q_{Wait}$ describing the charge or discharge history during the wait-period before the transient load parameterized by $I_{Load}$ and pulse length T, the output value of which having units in ampere-seconds. This metric is a prediction of the lowest voltage that will occur during over a relatively longer time horizon. In contrast, the voltage response of an immediate discharge event corresponds to a discharge that is assumed to begin at the point of time at which the SoF is calculated.

Another difference between an immediate and future predicted load response is that the predicted ambient temperature when the discharge occurs is also used in the calculation of the future voltage response. This is to allow low temperatures to be predicted in the future when the load occurs to model and mitigate a worst-case operational scenario. In contrast, the voltage response of an immediate discharge event assumes that the present temperature is valid during the discharge.

Figure 3:
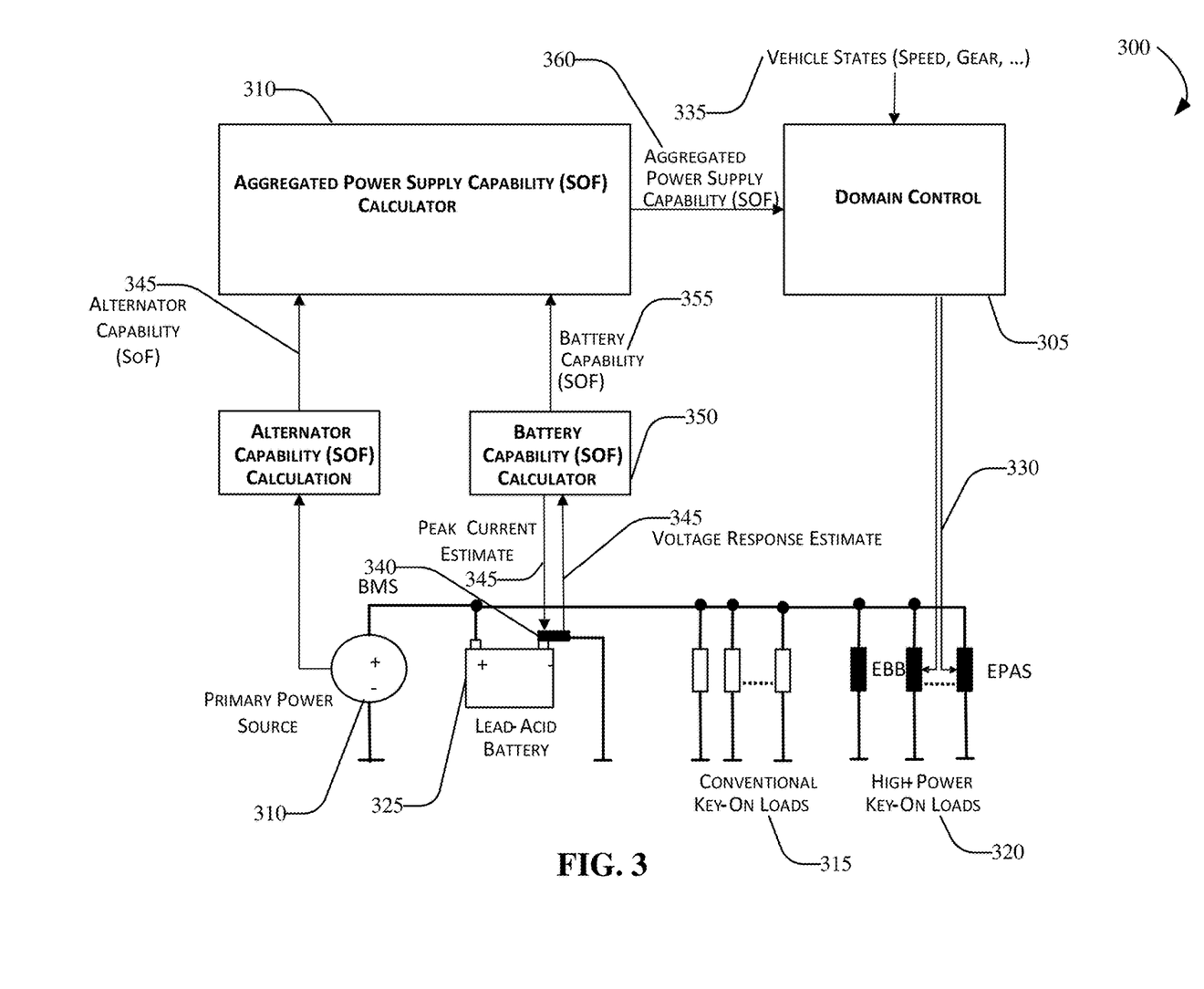
FIG. 3 depicts the system further including a domain controller in accordance with the present disclosure.

FIG. 2 described embodiments that publish an aggregated SoF signal to one or more actuators via the load controller 205. FIG. 3 depicts the SoF adaptive power management system 300, which may be substantially similar or identical to the system 107, but further including a domain controller 305 in accordance with the present disclosure. According to one embodiment, as shown in FIG. 3, it may be advantageous to provide the current budget to a domain controller 305 responsible for publishing the entire current budget to one or more actuators managed by the domain controller 305. For example, the actuators may include conventional key-on loads 315 and/or high-power key-on loads 320, which may receive maximum battery discharge current with bounded voltage responses as managed by the domain control 305.

The state of function metric SOF_MaxI($U_{Min}$,T) describes the maximum immediate discharge current that can be applied for a period defined by such that the voltage at the battery terminals remains above a voltage level defined by the parameter $U_{Min}$. While SOF_$U_{Min}$ is defined in volts, SOF_MaxI is defined in amperes. At this time, no commercial battery monitoring sensor provides an output signal corresponding to SOF_MaxI($U_{Min}$,T).

SOF_MaxI($U_{Min}$,T) for a battery can be calculated iteratively using an equivalent circuit model if the states of the capacitive elements $C_{Z1}$, $C_{Z2}$, . . . $C_{Zn}$ are continuously updated such that the sum of the states and the voltage $U_{OC}$ equals the voltage measured at the terminals of the energy storage device 325 at any point in time if no current is flowing. The output of an equivalent circuit model is the voltage across the energy storage device 325 terminals under load.

It is assumed, in the present embodiment, that the BMS 340 can calculate the voltage response of a transient current that occurs immediately, which is a functionality available in conventional BMSs. A battery capability (SoF) calculation element 350 may send one or more peak current estimates (e.g., battery capability (SoF) signal 355) to the BMS sequentially. The value may be increased every time a new peak current value is sent until the voltage response estimate (output of BMS) decreases below a desirable threshold.

For example, assuming that the battery capability (SoF) calculator element 350 runs a simulation with the model having the states of the capacitive elements as initial conditions, and a constant current I with duration T as an input, the output representing the voltage across the terminals may be designated as U(I,T), and the minimum value of the output over the period T may be designated as min(U(I,T)). This is represented in FIG. 3 as a battery capability (SoF) signal 355. In one aspect, the state of function metric SOF_MaxI($U_{Min}$,T) may be estimated using an aggregated power supply capability (SoF) calculation element 310 by carrying out simulations to calculate the terminal voltage with an incrementally increasing current until the terminal voltage drops below the threshold minimum.

When this occurs, the maximum current value may be determined by linearly interpolating between the last two values of current. For example, the aggregated power supply capability (SoF) calculation element 310 may determine a first power storage voltage response to a current over time, and determine whether the first power storage voltage response is less than a threshold voltage. The aggregated power supply capability (SoF) calculation element 310 may decrease the maximum current threshold for the power storage output less than the threshold, and if it is determined that the next voltage response to a lower current is equal or greater than the threshold current, recalculate the maximum current budget for the aggregated power supply at a future time horizon based on the minimum voltage threshold. The domain control 305 may distribute the aggregated power supply capability SoF 330 to a braking actuator and a steering actuator (e.g., high-power key-on loads 320) based on one or more present vehicle states 335.

As described above, the maximum load current $I_{Load}$ that may be drawn from the power storage 215 for a given period of time T such that the voltage at the output terminals of the power storage 215 is greater or equal to a minimum voltage threshold $U_{Min}$ such that, $$\text{SOF\_Min}U(I_{Load}, T, \text{Temp}_{Dis}, Q_{Wait}, T_{Wait}) = U_{Min}^{min}$$
such that $I = I_{Load}$.

The aggregated power supply capability (SoF) calculator may aggregate the battery capability (SoF) signal 355 with an alternator capability (SoF) signal 345, and output the aggregated power supply capability (SoF) signal 360 to the domain control 305. Accordingly, the domain control 305 distributes the budget (e.g., the aggregated power supply capability (SoF) signal 360 between the EPAS (steering) and EBB (braking) actuators as parts of high-power key-on loads 320 in an intelligent manner using the present vehicle states 335 like speed, gear, and clutch activation.

Figure 4:
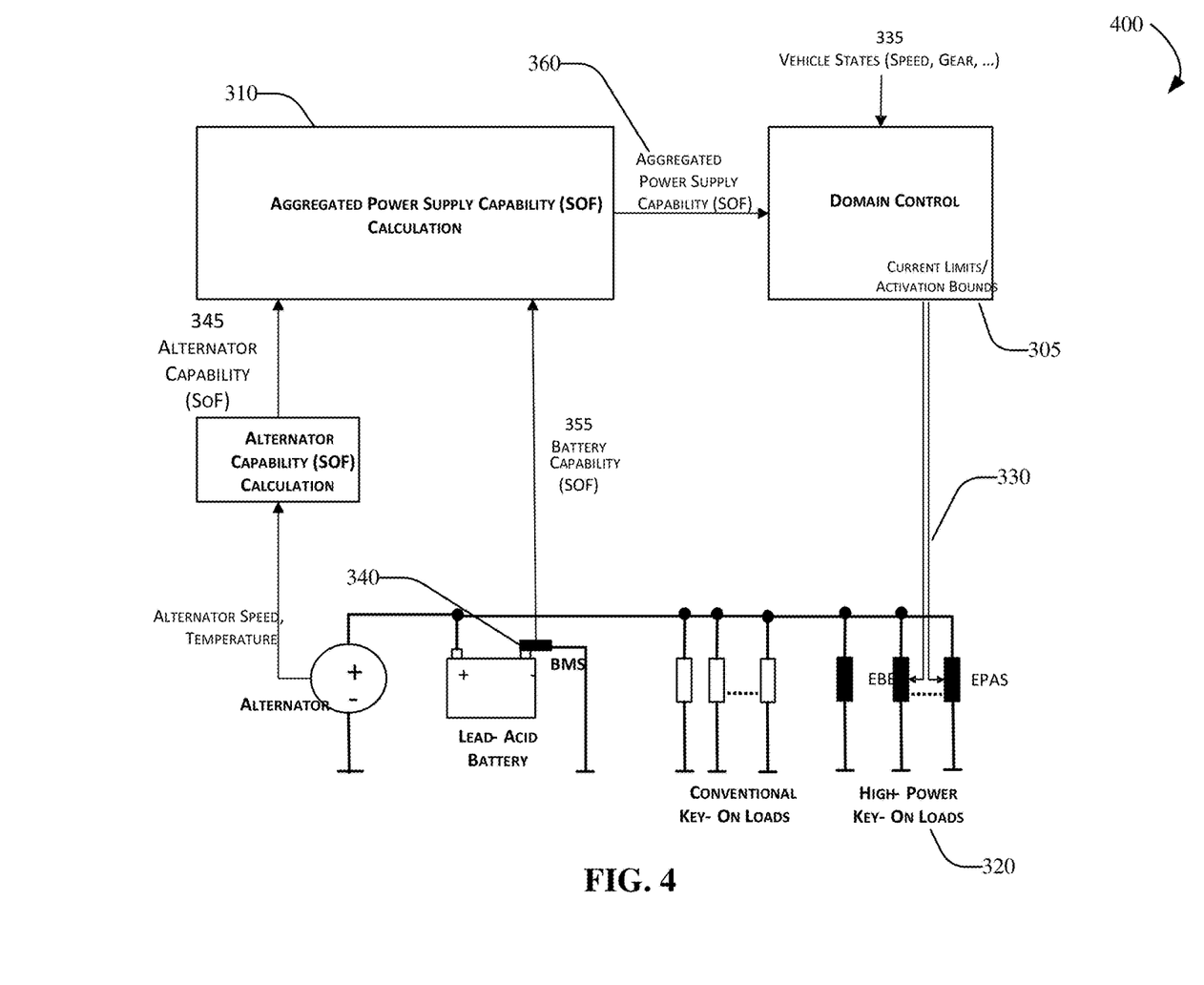
FIG. 4 illustrates another example SoF adaptive power management system in accordance with the present disclosure.

According to another embodiment, FIG. 4 depicts an embodiment similar to the SoF adaptive power management system 107 where an SoF adaptive power management system 400 performs battery monitoring via the BMS 340 directly, such that SOF_MaxI is defined where the maximum load current $I_{Load}$ that the voltage at the output terminals of the energy storage device 325 for a given period of time T such that the voltage at the output terminals of the energy storage device is greater or equal to a minimum voltage threshold $U_{Min}$ where, $$\text{SOF\_Max}I(U_{Min}, T) = I_{Load}^{max} \text{ such } U_{Terminals} > U_{Min}.$$

Accordingly, the $U_{Min}$ is calculated by the BMS 340, and the battery capability ((SoF) signal 355) is sent to the aggregated power supply capability (SoF) calculation element 310. The aggregated power supply capability (SoF) calculation element 310 may aggregate the alternator capability (SoF) signal 345 with the power supply capability (SoF) signal 355. The aggregated power supply capability (SoF) signal 360 is then received at the domain control 305 to control the high-power key-on loads 320. In particular, the domain control 305 may set current limits and activation bounds for the actuators associated with the high-power key-on loads 320.

Figure 5:
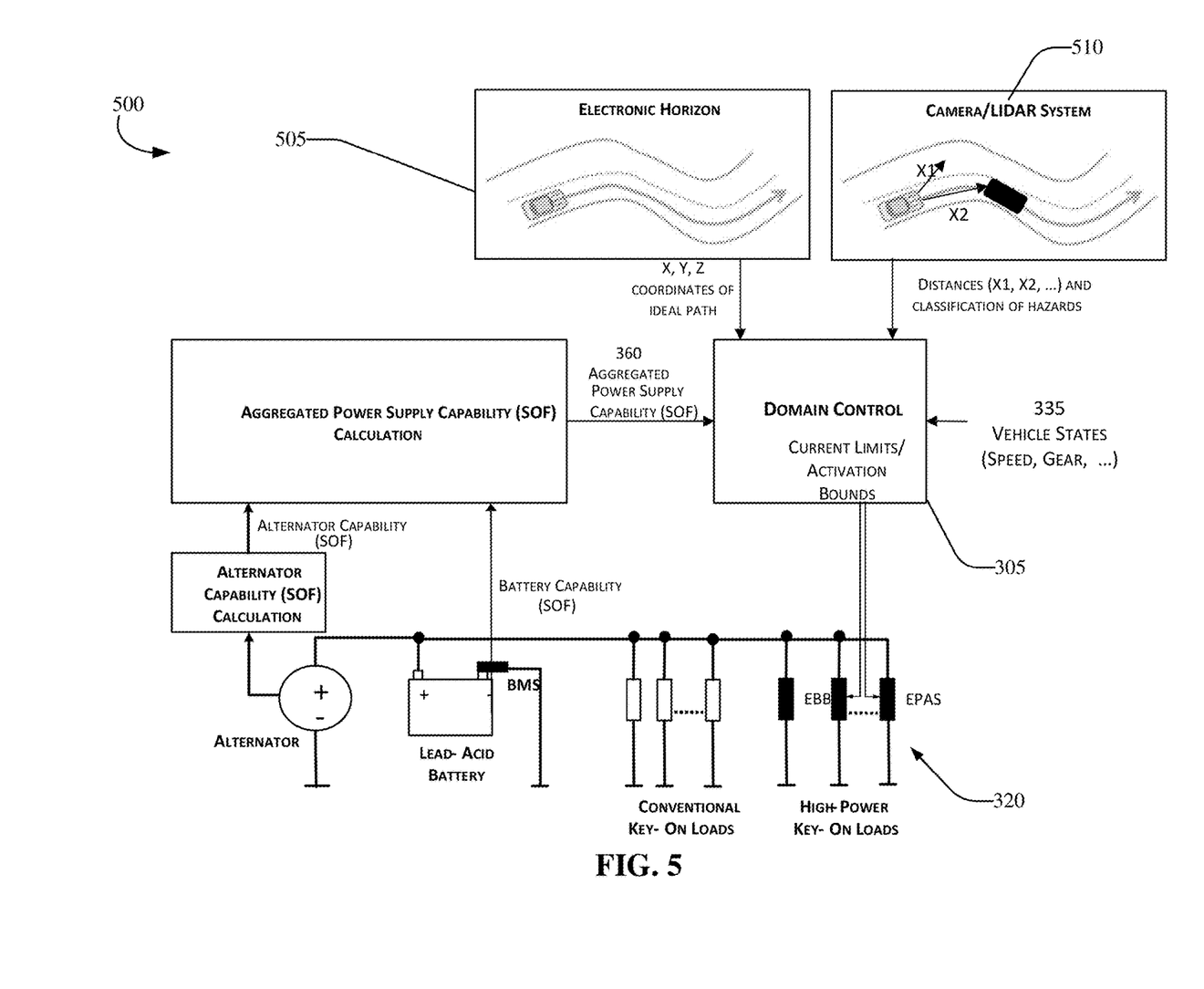
FIG. 5 depicts SoF adaptive power management system configured for domain control based on a prediction of a road path over a time horizon in accordance with the present disclosure.

FIG. 5 depicts an SoF adaptive power management system 500 configured for domain control based on a prediction of a road path over a time horizon, in accordance with present disclosure. In some aspects, it may be advantageous to predict a future condition within a predetermined time horizon where the aggregated power supply capability will require mitigating measures due to an obstacle or future operational condition on the vehicle pathway. Accordingly, the SoF adaptive power management system 500 may receive a prediction of a road characteristics at a future time horizon. The road characteristic may be a hazard or other predictable cause for power demands.

The prediction may include an electronic horizon 505 indicative of a prediction of the road over a time horizon ahead via the TCU 160. For example, the electronic horizon may include a GPS-based service (Electronic Horizon). The VPS 181 (as shown in FIG. 1) may provide camera and/or LiDAR system data 510 that include distances associated with one or more hazards (e.g., distances (X1, X2, . . . XN) and classification of one or more hazards associated with each respective distance received. A hazard may be a road condition, an object to be navigated around, etc. Many current vehicle navigation and sensory systems can include LiDAR, RADAR, vision systems, and other sensory devices configured to identify and characterize road hazards ahead of the vehicle, including any hazards that may be encountered at a future moment in time (e.g., a time horizon). Accordingly, the domain control 305 may predict turn operation(s) and braking operation(s) within a time horizon. Using this information, the domain control 305 may publish a budget or aggregated power supply capability (SoF) signal 360 between the EPAS (steering) and EBB (braking) actuators (e.g., high-power key-on loads 320) in a manner that maintains vehicle stability that tracks an optimal course. The publishing can include calculating a distance from the vehicle to a hazard along a predicted path based on the future time horizon and cause to control the active chassis power system actuator(s) by controlling, based on the aggregate SoF, the brake actuator, the steering actuator, or other actuators, based on the distance from the vehicle 105 to the hazard (not shown) such that the maximum current drawn by the actuators is less than the aggregated power supply capability SoF signal 360.

For example, the domain control 305 may receive the present vehicle states 335, such as speed, gear states, etc. The domain control may also limit other chassis actuators, including rear-wheel steering and electrically actuated roll control (EARC) to adjust torque on anti-sway bars using electric motor actuators (not shown in FIG. 5). More particularly, the domain control 305 may send signals to the BCM 193, the TCM 190, the ECM 185, and/or other elements of the VCU 165 to provide the power and control limits to the chassis actuator(s) (not shown in FIG. 5) associated with those respective VCU elements. Controlling the brake actuator and steering actuators can include, for example, setting, during the time horizon, the primary power source current output at output such that the voltage at output terminals of an energy storage device may be equal or greater than a minimum threshold voltage and setting, during the time horizon, the power storage current output such that the voltage at the output terminals of the device is equal or greater than a minimum threshold voltage.

Figure 6:
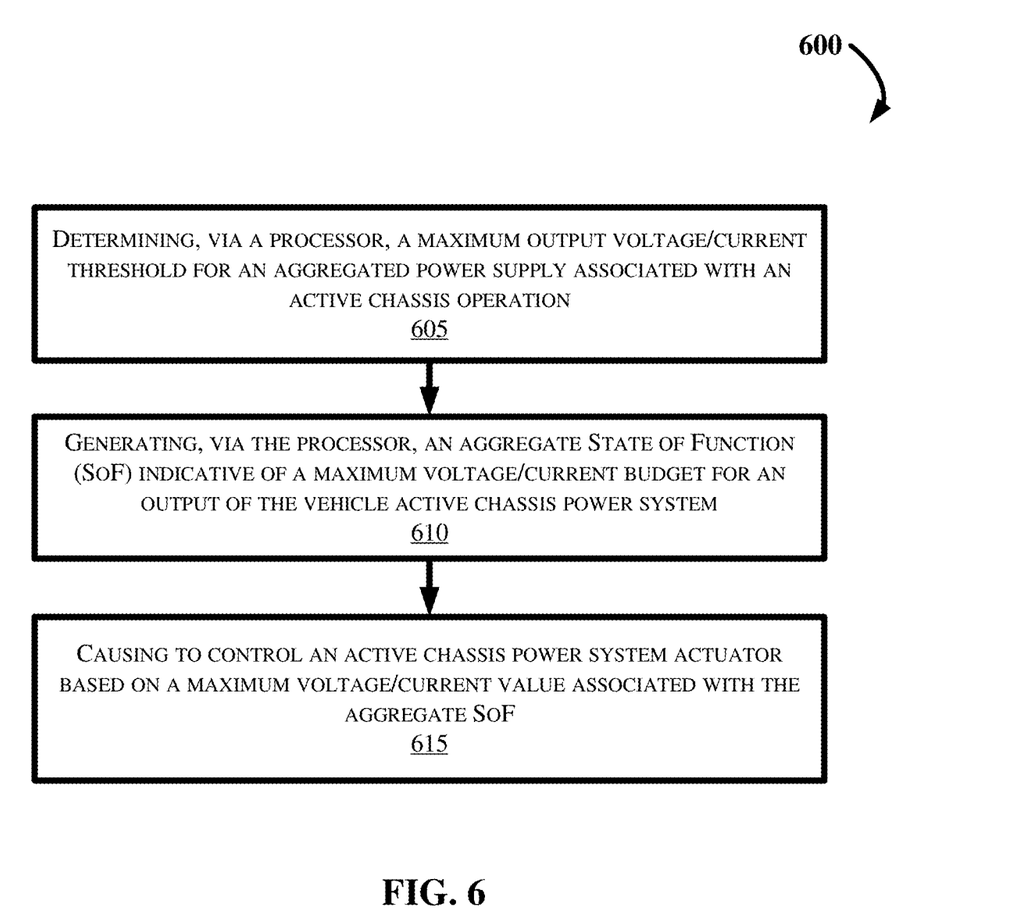
FIG. 6 depicts a flow diagram of an example method for controlling a vehicle active chassis power system in accordance with the present disclosure.

FIG. 6 is a flow diagram of an example method 600 for controlling a vehicle active chassis power system, according to the present disclosure. FIG. 6 may be described with continued reference to prior figures, including FIGS. 1-5. The following process is exemplary and not confined to the steps described hereafter. Moreover, alternative embodiments may include more or less steps that are shown or described herein, and may include these steps in a different order than the order described in the following example embodiments.

Referring now to FIG. 6, at step 605, the method 600 may commence with determining, via a processor, a maximum output voltage/current threshold for an aggregated power supply associated with an active chassis operation. In some aspects, the active chassis operation can include one or more of a braking operation and a steering operation. This step may include determining the maximum output current threshold for the aggregated power supply in a predetermined interval of time.

At step 610, the method 600 may further include generating, via the processor, an aggregate State of Function (SoF) indicative of a maximum voltage/current budget for an output of the vehicle active chassis power system. The aggregate SoF is based on a primary power source voltage/current output and a power storage voltage/current output.

At step 615, the method 600 may further include causing to control an active chassis power system actuator based on a maximum voltage/current value associated with the aggregate SoF. This step may include publishing the aggregate SoF to a steering actuator. In other aspects, the step may include publishing the aggregate SoF to a braking actuator.

According to other embodiments, this step may include publishing the aggregate SoF to a domain controller. Generating the aggregate SoF indicative of the maximum current budget for the output of the aggregated power supply can include determining a present battery state comprising a battery output voltage/current. With greater detail, this step may include determining a first power storage voltage response to a current over time, determining that the first power storage voltage response is less than a threshold voltage, decreasing a maximum current threshold for power storage output is less than a threshold, determining that a second voltage response to a lower current is equal to or greater than the threshold voltage and recalculating the maximum current budget for the aggregated power supply at a future time horizon based on the minimum voltage threshold.

In other aspects, this step may further include distributing an aggregated power supply capability SoF to a braking actuator and a steering actuator based on one or more present vehicle states. The present vehicle states can include one or more of a speed, a gear state, and a clutch actuation associated with the vehicle.

Causing to control the active chassis power system actuator can further include determining, via a battery monitoring sensor, a battery capability, updating the aggregate SoF with a maximum load voltage/current that may be drawn from an energy storage device for a given period of time T such that the voltage/current at output terminals of the energy storage device is greater or equal to a minimum threshold voltage/current, and causing to control the active chassis power system actuator based on the maximum load voltage/current for the given period of time T.

When considering a future time horizon, causing to control the active chassis power system actuator can further include receiving a prediction of a road characteristic at a future time horizon, predicting, based on the prediction of the road characteristic, a turn operation or a braking operation, publishing the aggregate SoF comprising an aggregated power supply capability to a domain control comprising a brake actuator and a steering actuator, calculating a distance from the vehicle to a hazard along a predicted path based on the future time horizon, and causing to control an active chassis power system actuator by controlling, via the domain controller, based on the aggregate SoF, the brake actuator and the steering actuator based on the distance from the vehicle to the hazard such that the maximum current drawn by the actuators is less than the aggregated SoF.

In some aspects, controlling the brake actuator and the steering actuator can include setting, during the time horizon, the primary power source current output such that the voltage at the output terminals of an energy storage device is equal or greater than a minimum threshold voltage, and setting, during the time horizon, the power storage current output such that the voltage at the output terminals of the device is equal or greater than a minimum threshold voltage.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application-specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a vehicle active chassis power system, comprising:
    determining, via a processor, a maximum output voltage/current threshold for an aggregated power supply associated with an active chassis operation;
    generating, via the processor, an aggregate State of Function (SoF) indicative of a maximum voltage/current budget for an output of the vehicle active chassis power system, wherein the aggregate SoF is based on a primary power source voltage/current output and a power storage current output; and
    causing to control an active chassis power system actuator based on a maximum voltage/current value associated with the aggregate SoF.

2. The method according to claim 1, further comprising determining the maximum output current threshold for the aggregated power supply in a predetermined interval of time.

3. The method according to claim 1, wherein the active chassis operation comprises one or more of a braking operation and a steering operation.

4. The method according to claim 1, wherein causing to control the active chassis power system actuator comprises:
    publishing the aggregate SoF to a steering actuator.

5. The method according to claim 1, wherein causing to control the active chassis power system actuator comprises:
    publishing the aggregate SoF to a braking actuator.

6. The method according to claim 1, wherein causing to control the active chassis power system actuator comprises:
    publishing the aggregate SoF to a domain controller.

7. The method according to claim 6, wherein generating the aggregate SoF indicative of the maximum current budget for the output of the aggregated power supply comprises:
    determining a present battery state comprising a battery output voltage/current.

8. The method according to claim 6, wherein generating the aggregate SoF indicative of the maximum current budget for the output of the aggregated power supply comprises:
    determining a first power storage voltage response to a current over time;
    determining that the first power storage voltage response is less than a threshold voltage;
    decreasing a maximum current threshold for power storage output is less than a threshold;
    determining that a second voltage response to a lower current is equal to or less than the threshold voltage;
    recalculating the maximum current budget for the aggregated power supply at a future point in time based on the minimum voltage threshold; and
    recalculating the maximum current budget for the aggregated power supply over a time horizon in the future based on the minimum voltage threshold.

9. The method according to claim 8, further comprising:
    distributing an aggregated power supply capability SoF to a braking actuator and a steering actuator based on one or more present vehicle states.

10. The method according to claim 9, wherein the present vehicle states comprise one or more of:
    a speed, a gear state, and a clutch actuation.

11. The method according to claim 6, further comprising:
    determining, via a battery monitoring sensor, a battery capability;
    updating the aggregate SoF with a maximum load voltage/current that may be drawn from an energy storage device for a given period of time T such that the voltage/current at output terminals of the energy storage device is greater or equal to a minimum threshold voltage/current; and
    causing to control the active chassis power system actuator based on the maximum load voltage/current for the given period of time T.

12. The method according to claim 6, further comprising:
    receiving a prediction of a road characteristic at a future time horizon;
    predicting, based on the prediction of the road characteristic, a turn operation or a braking operation;
    publishing the aggregate SoF comprising an aggregated power supply capability to a domain control comprising a brake actuator and a steering actuator;
    calculating a distance from the vehicle to a hazard along a predicted path based on the future time horizon; and
    causing to control an active chassis power system actuator by controlling, via the domain controller, based on the aggregate SoF, the brake actuator and the steering actuator based on the distance from the vehicle to the hazard such that the maximum current drawn by the steering actuator and the brake actuator is less than the aggregate SoF.

13. The method according to claim 12, wherein controlling the brake actuator and the steering actuator comprises:
    setting, during the time horizon, the primary power source current output at output such that the voltage at output terminals of an energy storage device are equal or greater than a minimum threshold voltage; and
    setting, during the time horizon, the power storage current output such that the voltage at the output terminals of the device is equal or greater than a minimum threshold voltage.

14. The method according to claim 1 wherein the primary power source comprises an alternator.

15. The method according to claim 1 wherein the primary power source comprises a DC/DC converter.

16. The method according to claim 1 wherein the primary power source comprises a fuel cell.

17. The method according to claim 1 wherein the power storage comprises one or more of a lead-acid battery and an ultracapacitor.

18. The method according to claim 1 wherein generating the aggregate SoF indicative of the maximum voltage/current budget for the output of the vehicle active chassis power system further comprises:
publishing, via the processor, the aggregate SoF in a continuous manner prior to receiving a request associated with activation of a transient load.

19. A State of Function (SoF) adaptive power management system, comprising:
a processor; and
a memory for storing executable instructions, the processor programmed to execute the instructions to:
determine a maximum output voltage/current threshold for an aggregated power supply associated with an active chassis operation;
generate an aggregate SoF indicative of a maximum voltage/current budget for an output of a vehicle active chassis power system, wherein the aggregate SoF is based on a primary power source current output and a power storage current output; and
cause to control an active chassis power system actuator based on a maximum voltage/current value associated with the aggregate SoF.

20. A non-transitory computer-readable storage medium in a vehicle State of Function (SoF) adaptive power management system, the computer-readable storage medium having instructions stored thereupon which, when executed by a processor, cause the processor to:
determine a maximum output current threshold for an aggregated power supply associated with an active chassis operation;
generate an aggregate SoF indicative of a maximum current budget for an output of a vehicle active chassis power system, wherein the aggregate SoF is based on a primary power source current output and a power storage current output; and
cause to control an active chassis power system actuator based on a maximum current value associated with the aggregate SoF.

* * * * *